US012669819B2

(12) United States Patent
Ma et al.

(10) Patent No.: US 12,669,819 B2
(45) Date of Patent: Jun. 30, 2026

(54) COVERAGE PATH PLANNING METHOD FOR MULTIPLE UNMANNED SURFACE MAPPING VEHICLES

(71) Applicant: WUHAN UNIVERSITY OF TECHNOLOGY, Wuhan (CN)

(72) Inventors: Yong Ma, Wuhan (CN); Hao Li, Wuhan (CN); Huaxiong Bi, Wuhan (CN); Xinping Yan, Wuhan (CN); Yuanzhou Zheng, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 516 days.

(21) Appl. No.: 18/122,710

(22) Filed: Mar. 17, 2023

(65) Prior Publication Data

US 2023/0236599 A1     Jul. 27, 2023

Related U.S. Application Data

(63) Continuation of application No. PCT/CN2021/117159, filed on Sep. 8, 2021.

(30) Foreign Application Priority Data

Sep. 18, 2020     (CN) ......................... 202010985341.4

(51) Int. Cl.
G05D 1/00          (2024.01)
G01C 21/00         (2006.01)

(52) U.S. Cl.
CPC ....... G05D 1/0206 (2013.01); G01C 21/3841 (2020.08); G05D 1/0027 (2013.01)

(58) Field of Classification Search
CPC ............... G05D 1/0206; G05D 1/0027; G01C 21/3841; G01C 13/008; G01C 21/203; G01C 21/3804
USPC ........................................... 701/21
See application file for complete search history.

(56) References Cited

U.S. PATENT DOCUMENTS

| | | | | |
|---|---|---|---|---|
| 2017/0039744 A1* | 2/2017 | Steward | ................ | G06T 11/206 |
| 2018/0246520 A1* | 8/2018 | Martinson | ............ | G05D 1/0094 |
| 2020/0180740 A1* | 6/2020 | Christ | .................... | B63B 23/26 |

* cited by examiner

*Primary Examiner* — Fadey S. Jabr
*Assistant Examiner* — Paula L Schneider

(57) ABSTRACT

Disclosed is a coverage path planning method for multiple unmanned surface mapping vehicles, comprising: simultaneously creating submaps and an overall map; outputting its own position information and obstacle information, transmitting to $$BL_l^i$$

and updating $$BL_l^m;$$

defining a behavior strategy list (BS); determining the BS with priority for path planning, outputting a to or th state if any criterion is satisfied; when trapped in a local optimum, updating map layers layer-by-layer going upwards, searching for tp in the corresponding layers, performing a BS determination, and outputting a tr instruction; if no target point is found even at the highest layer, checking each $CS_{P_i} \in \{FN_i, UFN_i\}$, and determining a termination. As such, the coverage rate and coverage effect of multiple unmanned surface mapping vehicles in a complex environment can be increased, thus increasing the operational efficiency of the unmanned surface mapping vehicles.

7 Claims, 5 Drawing Sheets importing a static map in an initialization stage, initializing grid state according to the static map, creating submaps and an overall map synchronously, and conducting area division on the submaps and the overall map based on task performance —— S101 according to USMV$_i$ of each sub-area P$_i$ in the submaps $BL_j^i$ and the overall map $BL_j^m$, outputting its own position information ω and obstacle information η, transmitting to $BL_j^i$ and updating $BL_j^m$, and then path planning is carried out to find a target point tp —— S102 when trapped in a local optimum, map level is updated layer by layer upward, and the target point tp is found in a corresponding level, and a BS determination is conducted, and sending tr instruction to the USMV$_i$ of the sub-area Pi, where, the BS determination represents the collaborative behavior strategy determination —— S103 if the target point has not yet been found in the highest map level, checking regional depth sounding task status of each USMV$_i$ in the current sub-area P$_i$, to determine whether to end —— S104

FIG. 2

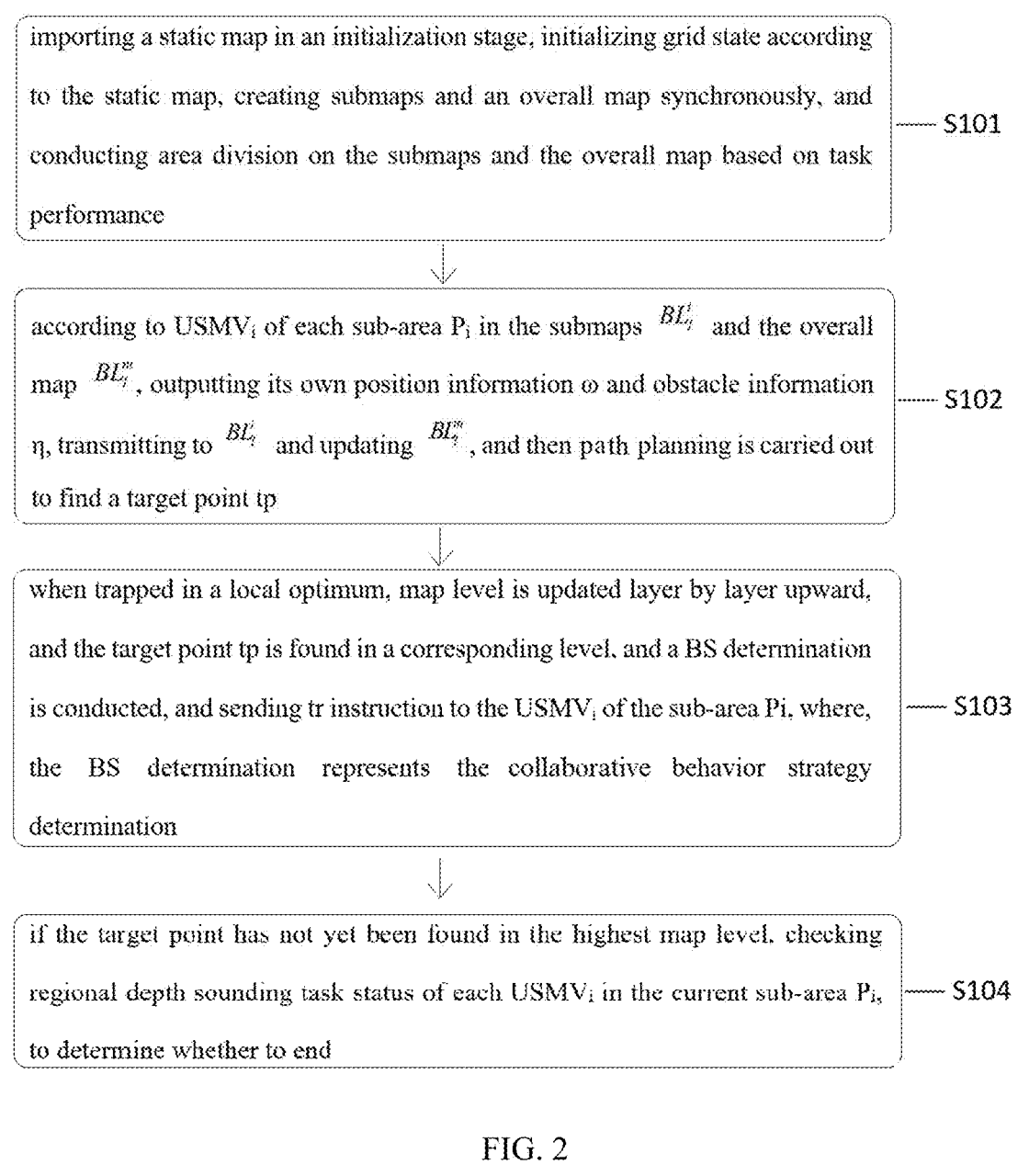

Area division

Recall and transfer

Area exchange

Recognizing obstacles

COVERAGE PATH PLANNING METHOD FOR MULTIPLE UNMANNED SURFACE MAPPING VEHICLES

FIELD OF THE DISCLOSURE

The disclosure relates to the technical field of path planning, in particular to a coverage path planning method for multiple unmanned surface mapping vehicles.

BACKGROUND

Underwater topographic exploration and survey operations are the basic conditions to ensure the safety of waterway transportation, and their demand is increasingly strong. The traditional water area survey operations are mainly realized by manned ships carrying measurement equipment to and fro in the operating waters. In recent years, with the development of artificial intelligence technology and shipbuilding industry, Unmanned Surface Vehicle (USV) has shown its ability in water area survey tasks with its advantages of shallow draft, low energy consumption, flexible operation, and no need for manned.

At present, coverage path planning research focuses on the field of ground mobile robots. Compared with ground mobile robots, unmanned surface mapping vehicles (USMVs) have a larger operating range and more complex water environment, which requires higher demand for the efficiency and robustness of coverage path planning algorithm.

SUMMARY

The purpose of this disclosure is to provide a coverage path planning method for multiple unmanned surface mapping vehicles to improve the coverage rate and coverage effect of unmanned surface mapping vehicles in complex working environment, and improve the operation efficiency of unmanned surface mapping vehicles.

To achieve the above purpose, this disclosure provides a coverage path planning method for multiple unmanned surface mapping vehicles, comprising:

(1) importing a static map in an initialization stage, initializing grid state according to the static map, creating submaps and an overall map synchronously, and conducting area division on the submaps and the overall map based on task performance; where, the static map is used to reflect the environmental information, the submaps represents area map formed after the gridded static map is divided into areas using CCIBA* algorithm, and the overall map represents integration and iteration of the submaps;

(2) according to $USMV_i$ of each sub-area $P_i$ in the submaps $$BL_l^i$$

and the overall map $$BL_l^m,$$

outputting its own position information $\omega$ and obstacle information $\eta$, transmitting to $$BL_l^i$$

and updating $$BL_l^m,$$

and then path planning is carried out to find a target point tp, tp represents grid index value of a next target point of USMV, and tr instruction indicates that the USMV is in the Travel state, which is the abnormal task status after the local optimum is reached;

(3) when trapped in a local optimum, map level is updated layer by layer upward, and the target point tp is found in a corresponding level, and a BS determination is conducted, and sending tr instruction to the $USMV_i$ of the sub-area Pi, where, the BS determination represents the collaborative behavior strategy determination, tp represents grid index value of a next target point of USMV, and tr instruction indicates that the USMV is in the Travel state, which is the abnormal task status after the local optimum is reached;

(4) if the target point has not yet been found in the highest map level, checking each $CS_{P_i} \in \{FN_i, UFN_i\}$, and the BS determination is over, where $CS_{P_i}$ represents the status of the regional depth sounding task in current sub-area where $USMV_i$ is located, $FN_i$ represents complete, and $UFN_i$ represents incomplete.

Compared with the prior art, the beneficial effects of this disclosure are: This disclosure draws on the traditional coverage path planning method and conducts in-depth research on collaborative coverage path planning of multiple unmanned surface mapping vehicles. The coverage path planning method for multiple unmanned surface mapping vehicles (Collaborative Coverage IBA*, CCIBA*) is designed to plan an efficient and high-quality scanning path for unmanned surface mapping vehicles. The simulation results show that the performance of CCIBA* is significantly improved compared with the existing methods in terms of path length, turning times, number of units, and coverage rate.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures:

FIG. 2 is another flow diagram of coverage path planning method for multiple unmanned surface mapping vehicles provided by an embodiment of this disclosure.

DETAILED DESCRIPTION OF PREFERRED EMBODIMENTS

The technical solutions in the embodiments of the application will be described clearly and completely in combination with the drawings in the embodiments of the application.

The purpose of this disclosure is to provide a coverage path planning method for multiple unmanned surface mapping vehicles (CCIBA*). CCIBA* algorithm is an extension of IBA* (Improved BA*). Both CCIBA* and IBA* are improvements on the traditional BA* algorithm to improve the coverage rate and coverage effect of unmanned surface mapping vehicles under complex operation environment and improve the operation efficiency of unmanned surface mapping vehicles. In order to make the above purposes, features, and advantages of this disclosure more understandable, this disclosure will be further described in detail with the attached drawings and specific implementation methods.

Figure 1:
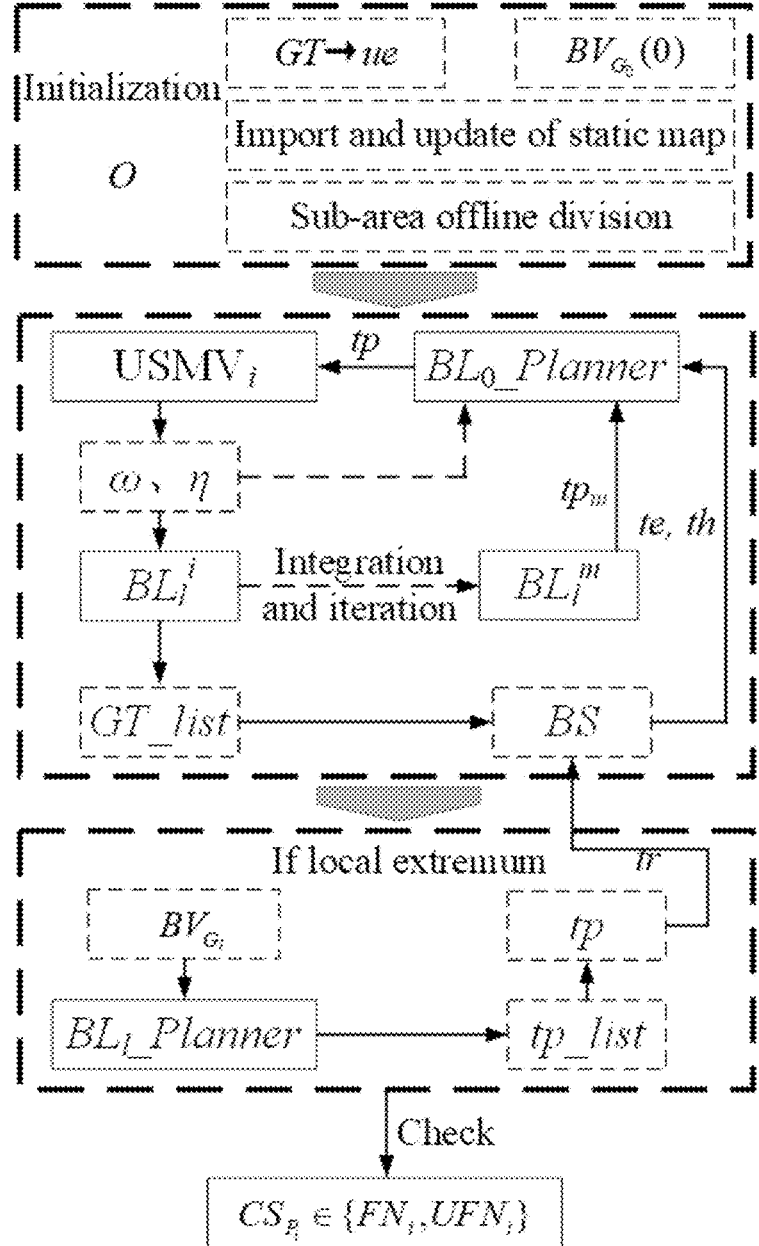
FIG. 1 is a flow diagram of coverage path planning method for multiple unmanned surface mapping vehicles provided by an embodiment of this disclosure.

As shown in FIG. 1, the flow diagram of a coverage path planning method for multiple unmanned surface mapping vehicles (CCIBA*) provided by this disclosure comprises: O stage, $$BL_0^m$$

level map stage, $$BL_i^m$$

level map stage, and E stage.

According to the above four stages, CCIBA* is divided into two processes: offline planning process and online planning process.

According to the offline planning process, sub-regions are divided based on task performance, and four typical collaborative behavior strategies are established, including area segmentation, backtracking transfer, area exchange and joint recognition of obstacles.

The online planning process specifically comprises task decomposition of scanning scenario and map update of scanning scenario.

Specifically, FIG. 2 shows the flow diagram of another coverage path planning method for multiple unmanned surface mapping vehicles provided by an embodiment of this disclosure, comprising the following steps:

S101: O stage: importing a static map in an initialization stage, initializing grid state according to the static map, creating submaps and an overall map synchronously, and conducting area division on the submaps and the overall map based on task performance;

where, the static map is used to reflect the environmental information, that is, the navigation map of the unmanned surface mapping vehicles (nautical chart or river chart). The submaps and the overall map all reflect the navigation environment information of the unmanned surface mapping vehicles. Submaps represents the area map formed after the gridded static map is divided into areas using CCIBA* algorithm, and overall map represents the integration and iteration of submaps.

In this disclosure, conducting area division on the submaps and the overall map based on task performance, comprising:

(1) multiple unmanned surface mapping vehicles: setting up multiple USMV sets, $U=\{USMV_i|1\leq i\leq I\}$, I represents the number of USMVs, and the core goal of collaborative coverage is to enable i USMVs to fully traverse the entire task area P under the premise of full efficiency;

(2) task performance: according to the performance of the $USMV_i$ individual or the ability to perform coverage tasks, the task performance index Hi (i=1, . . . , I) is proposed, which depends on sensor performance, task function, and energy consumption limit carried by the USMV, and $$\sum_{i=1}^{I} H_i = 1;$$

(3) area division: an overall task area P is divided into I parts according to the number of USMVs, where each part corresponds to the area where the USMV is located, and each part is expressed by its percentage of area, where each part is expressed as $P_i$, i=1, . . . , $0<P_i<1$, and $$\sum_{i=1}^{I} P_i = 1;$$

(4) grid restriction: each grid $\alpha$ in the free space $P_F$ of the overall task area P is specified and scanned by at least one $USMV_i$:

$$Y(\alpha, i) = \begin{cases} 1, & BV_\alpha^i(t) \leq 0 \\ 0, & else \end{cases}$$

$$\sum_{USMV_i \in U} Y(\alpha, i) \geq 1, \forall \alpha \in P_F$$

where, the free space is determined by $0<Pi<1$ and $$\sum_{i=1}^{I} P_i = 1,$$

and $Y(\alpha,i)$ represents the grid restriction, $$BV_\alpha^i(t)$$

represents the grid $\alpha$ assignment at time t in the BL-level map.

$$BV_{\alpha_0}(t) = \begin{cases} -1, & GT_{\alpha_0(t)} = obs \text{ or } fz \\ 0, & GT_{\alpha_0(t)} = \exp \\ \varepsilon_{\alpha_0}, & GT_{\alpha_0(t)} = ue \end{cases},$$

For example,

Where $BV_{\alpha_0}(t)$ represents grid $\alpha_0$ assignment at time tin the $BL_0$ level map;

$GT_{\alpha_0}(t)$ represents grid $\alpha_0$ status at time tin the $BL_0$ level map; $\varepsilon_{\alpha_0}$ represents the potential energy distribution formula; obs represents an obstacle; fz represents forbidden zone; exp represents the free space of the depth sounding mission completed; ue represents the free space of the depth sounding mission not completed.

(5) Planning objectives: for collaborative coverage of multiple unmanned surface mapping vehicles, the following factors are considered: overall coverage path, overall coverage time, single coverage performance and overall coverage rate:

$$\min \varphi = k_1 \cdot \sum_{i=1}^{I} P_i(d_{cost}) + k_2 \cdot \max_i P_i(t_{cost})$$

$$\text{S.T.} \begin{cases} \sum_{i=1}^{I} P_i = 1 \\ k_1 + k_2 + 1 \\ \sum_{USMV_i \in U} Y(\alpha, i) \geq 1, \forall \alpha \in P_F \end{cases}$$

where $\varphi$ represents overall cost model of coverage of multiple unmanned surface mapping vehicles, $k_1$ represents cost coefficient of coverage path, $k_2$ represents the cost coefficient of coverage time, $P_i(d_{cost})$ represents estimated coverage path of $P_i$ region, $P_i(t_{cost})$ represents estimated coverage time of $P_i$ region.

Firstly, $d_{cost}$ and $t_{cost}$ of an initial task area are estimated according to performance index $H_i$ of $USMV_i$, where dost represents coverage path, $t_{cost}$ represents coverage time, $d_{cost}$ is further modified according to distribution of obstacles, and $t_{cost}$ is adjusted considering the equipment carried by USMV, and redistributed sub-areas is finally output.

S102:

$$BL_0^m$$

level map stage: according to the $USMV_i$ of each sub-area $P_i$ in the submaps $$BL_i^i$$

and the overall map $$BL_i^m,$$

outputting its own position information co and obstacle information $\eta$, transmitting to $$BL_i^i$$

and updating $$BL_i^m,$$

and then the path planning is carried out to find the target point tp;

Among them, $BL_0, \ldots, BL_L$ represent each dynamic map level BaseLayer, L is the highest level, overall map is $$BL_i^m,$$

and submaps is $$BL_i^i.$$

S103:

$$BL_i^m$$

Level map stage: when trapped in a local optimum, the map level is updated layer by layer upward, and the target point tp is found in the corresponding level, and BS determination is conducted, and sending tr instruction to the $USMV_i$ of the sub-area Pi. Among them, the BS determination represents the collaborative behavior strategy determination, tp represents grid index value of the next target point of the USMV, and tr instruction indicates that the USMV is in the Travel state, which is the abnormal task status after the local optimum is reached;

In this disclosure, defining a list of behavior strategies: BS $\in$ {ex1, ex2, ex3, ex4}, ex1, ex2, ex3, ex4 correspond to the four situations of area segmentation, backtracking transfer, area exchange, and joint recognition of obstacles in the collaborative behavior strategies. The path planning gives priority to BS determination, and outputting to or th status if any situation is met, and outputting $tp_m$ based on $$BL_i^m$$

planning if cross-area is involved; if it does not comply with any of the conditions of BS, a path planning will be performed independently and tn or tc status will be output, where tn means to guide the USMV to be in the Normal status, so that it can perform the normal coverage task in the sub-area, and tc means to guide the USMV to start the depth sounding task.

In some of the optional implementations, typical collaborative behavior strategies include:

As shown in FIG. 3(a)-FIG. 3(d), the dotted line represents area boundary, the irregular graph represents the obstacle, and dot dash line represents area exchange or redistribution involved in the collaborative behavior strategies.

Figure 3A:
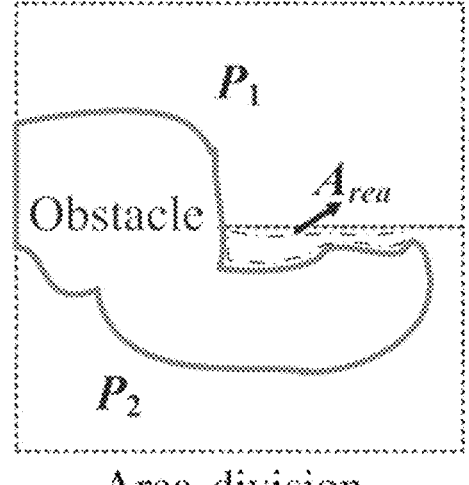
FIG. 3(a) is a typical behavior strategy diagram of area division provided by an embodiment of this disclosure.

As shown in FIG. 3(a), the area segmentation scenario involves small area temporary allocation and submaps update. For $P_2$ area, USMV will face two potential losses when it enters a small $A_{rea}$ area formed by obstacles and area boundaries. Firstly, according to obstacle processing strategy of IBA* algorithm, when entering the area, it is affected by the narrow terrain, and the cost of bypassing obstacles increases. Secondly, without interference, entering the region may trapped in a local optimum. In the case of the initial recognition of the obstacle edge in the $P_1$ area, the strategy incorporates the small $A_{rea}$ area in $P_2$ area into the $P_1$ area, so that the USMV can 'homeopathicly' perform coverage task in the $A_{rea}$ area while ensuring continuous coverage action. Due to the small area of the area, it has little effect on the task allocation of the two, and the completion time is basically unchanged.

Figure 3B:
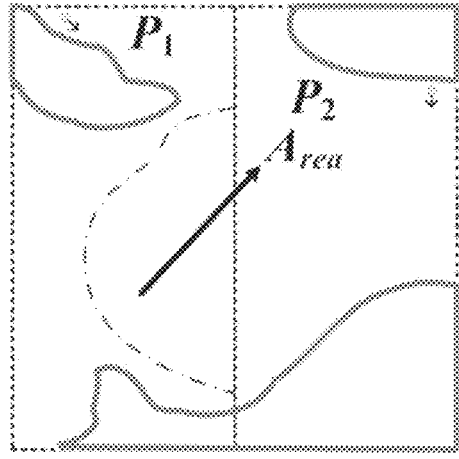
FIG. 3(b) is a typical behavior strategy diagram of recall and transfer provided by an embodiment of this disclosure.

As shown in FIG. 3(b), the backtracking transfer scenario involves the backtracking area caused by the change of path direction trend. In multi-USMV collaborative planning, the IBA* algorithm will generate potential backtracking areas due to the independent coverage update process of subareas. In this scenario, the $USMV_1$ in the $P_1$ area starts the detour action shortly after the starting position according to the IBA* algorithm. From this time until the $USMV_1$ is out of the lower left corner, the $A_{rea}$ area is still in the state of unexplored coverage. Therefore, this strategy divides the $A_{rea}$ area into $P_2$ area, so that the $USMV_2$ in the area continues to enter the $A_{rea}$ area to perform additional coverage actions, reducing the backtracking cost of $USMV_1$.

Figure 3C:
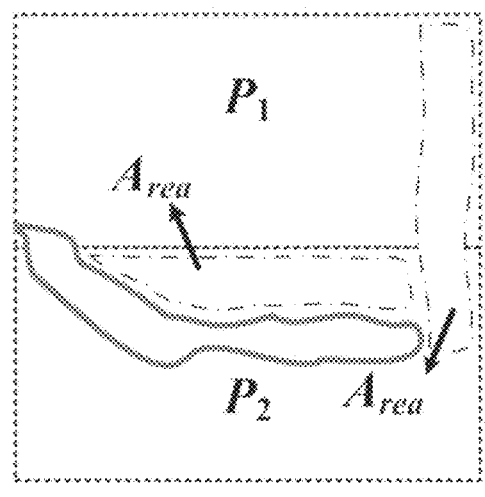
FIG. 3(c) is a typical behavior strategy diagram of area exchange provided by an embodiment of this disclosure.

As shown in FIG. 3(c), the area exchange scenario involves the exchange allocation of larger areas. Due to the influence of obstacles and boundaries, a large area is separated from the $P_2$ area. Continuing to perform the $A_{rea\_2}$ area task will increase the path cost and calculation cost of $USMV_2$ in the $P_2$ area. At this time, the $A_{rea\_2}$ area is located in the main coverage path direction of the $P_1$ area, and the $A_{rea\_1}$ area is located in the main coverage path direction of the $P_2$ area. Therefore, this strategy exchanges $A_{rea\_1}$ and $A_{rea\_2}$ in $P_1$ and $P_2$ areas. In this case, the coverage time and task volume are basically unchanged. Based on the roughly same obstacle avoidance cost, the impact on the path length is also small.

Figure 3D:
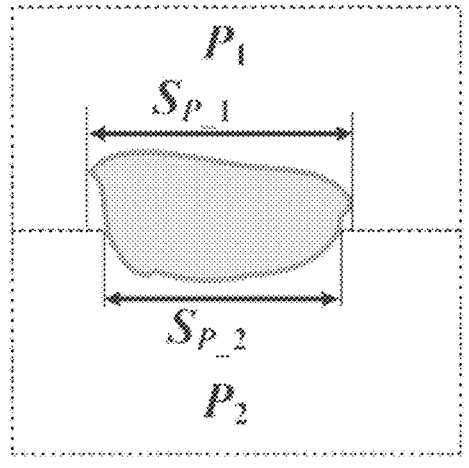
FIG. 3(d) is a typical behavior strategy diagram of recognizing obstacles provided by an embodiment of this disclosure.

As shown in FIG. 3(d), joint recognition of obstacles scenario is mainly aimed at the processing of obstacles. Due to the update of the independent sub-area map, the single $S_{P\_1}$ and $S_{P\_1}$ segment of the obstacle path is not complete for each USMV, and the obstacle may be omitted, which will affect the update of the total area map. Therefore, while covering the task execution, an additional obstacle joint discrimination process is added.

In some optional embodiments, the task decomposition of scanning scenario comprises:

Firstly, the grid task decomposition is defined:

$$G^m = \{g_\alpha^m, \alpha = 1, \dots N\}$$

$$g_\alpha^m \cap g_\beta^m = \varnothing, \forall \alpha, \beta \in \{1, \dots N\}$$

$$R_{G^m} = \bigcup_{i=1}^{I} R_i$$

Among them, $G^m$ represents grid list of the overall map, $$g_\alpha^m$$

represents grid individual space of the overall map, N represents the maximum number of the grids, $R_{G^m}$ represents the overall task based on the overall grid list $G^m$, $R_i$ represents the subtask numbered i, i represents the upper bound of the number of $P_i$ tasks, which is consistent with the number of USMVs participating in the task, and the superscript m has no specific physical meaning.

Figure 4:
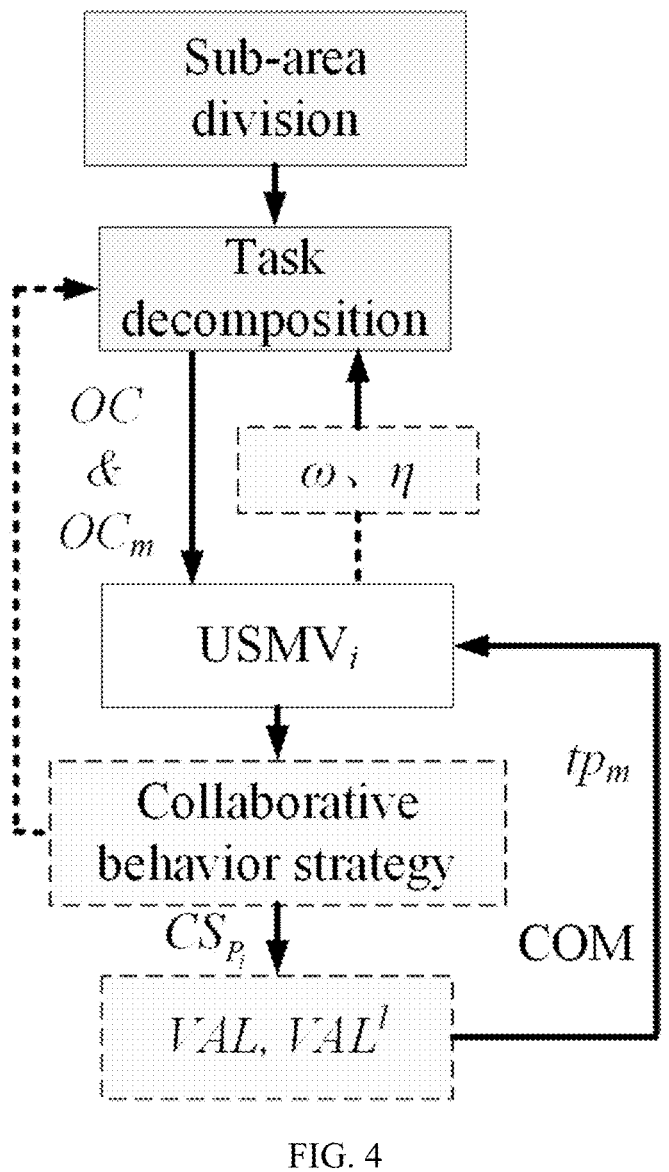
FIG. 4 is a $USMV_i$ task decomposition flow chart provided by an embodiment of this disclosure.

As shown in FIG. 4, the details are as follows:

(1) State Definition:

the state is the basic status of coverage path planning of multiple unmanned surface mapping vehicles, reflecting the overall process and internal adjustment of the task:

$$S^m = \{O, Q_{ini}, Q_{re}, E, COM\}$$

where $S^m$ represents the overall status list, O represents the start of the status, $Q_{ini}$ represents the initial task allocation, $Q_{re}$ represents the coordinated task allocation, E represents the end status, and COM represents the calculation status.

(2) Backtracking List:

$$\xi = \{\xi^i : i = 1, 2 \dots I\}$$

where, $\xi$ Represents a backtracking list, $\xi^i$ represents the backtracking list of each sub-area.

(3) Sub-Area Information:

$$CS_{P_i} \in \{FN_i, UFN_i\}$$

Where, $CS_{P_i}$ represents the status of the regional depth sounding task in the current sub-area where $USMV_i$ is located, $FN_i$ represents Finished, that is, completed, and $UFN_i$ represents Unfinished, that is, incomplete.

(4) USMV Control Command:

$$tp_m \in \{1, \dots N^m\}$$

$$OC_m \in \{tn, te, th\}$$

where, $tp_m$ represents the grid index value of the location of the next target point of the USMV in the overall map, $N^m$ represents the natural number set, and $OC_m$ represents the USMV task instruction in the overall map, which has higher permissions and priority than the sub-area; tn indicates to guide the USMV to be in the normal status, so that it can perform the normal coverage task in the sub-area; te indicates to guide the USMV to start switching areas and coordinate the coverage tasks between areas; th means to guide the USMV to continue to cover tasks in new areas;

At the beginning, initializing the system status list S. After the O status is turned on, the $Q_{ini}$ status starts first. The task area is initialized. According to task performance evaluation, the task area of each $USMV_i$ is roughly divided. At this time, the tn instruction is output to each $USMV_i$, and the sub-area coverage task is completed in its internal according to the IBA* algorithm, which is recorded as COM status. $USMV_i$ keeps recording and feedback $\omega$ and $\eta$, At the same time, obstacle information is generated in real time. According to the collaborative behavior matching, if the reallocation condition is met at this time, the system will be switched to the $Q_{re}$ state to start the reallocation of sub-areas, and the affected $USMV_i$ will be adjusted to te state. The coverage path planning algorithm will generate $tp_m$, temporarily jump out of the original region, and guide to start the th state after reaching the specified starting point. $USMV_i$ records the status value of the grid CS and the status value $CS_{P_i}$ of $P_i$ area in each area action.

In some optional implementation schemes, map update of scanning scenario comprises two parts: overall map update and map update of each sub-area. Among them, overall map has higher priority and authority, which can interfere when necessary.

The sub-area map update process is in an independent operation status. Each $USMV_i$ updates the overall map $$BL_l^m$$

and submaps $$BL_l^i$$

simultaneously in the action. After $P_i$ and $R_i$ allocate areas and tasks, each $$BL_l^i$$

independently updates to complete the multi-USMV coverage task, $$BL_l^m$$

mainly acts on the collaborative behavior between inter-regional $USMV_i$, so that $USMV_i$ has a more reasonable choice when searching for target points by upgrading the map level in the sub-area, thereby saving the overall coverage time and reducing the negative impact of tr state and te state on the path length.

The details are as follows:

(1) Initialization Modeling

Referring to the method of establishing the map level BaseLayer in the IBA* algorithm, the grid map level $$BL_0^m$$

with the highest fineness is still established in the overall map. Subsequently, the map level $$BL_0^i$$

of each sub-interval is continued to be established on the basis of the overall map. The specific coverage area is determined by the initial division of the overall area P. On the basis of the establishment of the $$BL_0^m$$

level and the $$BL_0^i$$

level, continuing to execute the upgrade instructions.

$$G_l^m = \{g_\alpha^{ml}, \alpha^{ml} = 1, \dots N_{ml}\}, \forall ml \in \{0, \dots mL\}$$

$$G_l^m = \bigcup_{i=1}^l G_l^i$$

Among them, $$G_l^m$$

represents overall map grid list of multiple unmanned surface mapping vehicles coverage containing all levels, $$g_\alpha^{ml}$$

represents the individual space of the grid, $N_{ml}$ represents the maximum number of $$G_i^m$$

grids, ml represents the map level, and mL represents the highest level.

(2)

$$BL_0^m$$

Level Map Modeling and Assignment
  Initializing $$BL_0^m$$

level map. After initializing the assignment of the $$BL_0^m$$

level map, the assignment of each $$BL_0^i$$

level map will continue, and its potential energy distribution will be opened independently from each $P_i$ interval, so each grid $$g_\alpha^{mi}$$

will have 2 potential energy values. However, this process does not significantly increase the amount of calculation. On the one hand, there is a direct and simple conversion relationship between the two. On the other hand, $$BL_0^m$$

will not be in an active state for most of the time like 0-level map of each $P_i$ interval, but only in the process of coordinated transfer of $USMV_i$ area.

For unknown obstacles, since a single $USMV_i$ updates GT_list={obs, exp, fz, ue} in an independent $P_i$ interval, if it is at the sub-region boundary, incomplete recognition will occur. At this time, the Bresenham algorithm is first used to rasterize the edge lines of the identified obstacles into pixels in the frame buffer, and then the Flood Fill algorithm is introduced to process the recognition results. After completing the obstacle update of $$BL_0^m,$$

the information will be transmitted to each $$BL_0^i$$

level map.

S104: E stage: if the target point has not yet been found in the highest map level, checking each $CS_{P_i} \in \{FN_i, UFN_i\}$, and the BS determination is over.

In some optional implementations, the O stage of step S101 comprises: At the beginning, each unmanned surface mapping vehicle is in the default starting position with a status of O. Coordinate transformation grid index of the static map is established. Grid status update is carried out in each submaps, and the 0~L level assignment of all maps is updated in turn. The $USMV_i$ outputs the to instruction. At the same time, the $USMV_i$ records and transmits its own position ω and obstacle information η. Each $USMV_i$ starts to independently update its own grid status list GT_list and start the collaborative coverage task.

In some optional implementations, the $$BL_0^m$$

level map stage in step S102 comprises:
  In the $$BL_0^m$$

level map stage, the potential energy priority is assigned to each submap row by row to ensure the complete coverage path of $USMV_i$ in each submap.

If $BV_\omega > 0$ and $\{\omega^N, \omega^S\} \subset F^0$, it is consistent with the IBA* algorithm action of single USMV, and the relative optimal path is selected by calculating the potential generation value J(tp). Similarly, if one side of $\omega^N$ and $\omega^S$ is close to the obstacle, it is preferred to select this direction, and the obstacle avoidance path of each interval $P_i$ is completed through this action, and the $ex_4$ process is started. ω represents the number of grid sequences at the current position of USMV, and BV refers to the assignment of the number of grid sequences co in the BL highest-level map.

Among them, the detection field of USMV in grid map is recorded as $D^0(\omega)$, $\omega \in D^0(\omega)$, $D^0(\omega)$ contains all grid information that can be sensed by the current position of the USMV. For any grid $\alpha_0$ in $D^0(\omega)$, if the connection with ω does not pass through fz or obs state grid, and its potential energy value is positive, the set is defined as the priority field, and the grids in the north and south directions in $D^0(\omega)$ are defined as $\omega^N$ and $\omega^S$.

If $BV_\omega > 0$, and only one side of $\omega^N$ and $\omega^S$ is ue status and the other side is forbidden area, then opening the tc instruction to guide the $USMV_i$ to start the depth sounding task, and updating $$BL_i^i$$

and $$BL_i^m$$

at the same time.

If $BV_\omega = 0, F^0 \neq \emptyset$, then $USMV_i$ begins to move to the next stage of traversal, taking $\alpha_0$ with the largest $BV_{\alpha_0}$ value in $F^0$ as the tp point, and $\alpha_0$ represents the grid index;

If the above situations are inconsistent, it is determined that $USMV_i$ is in a locally optimal status at this time. Before upgrading the map level, BS determination is performed. If collaborative strategy is met, the preset action is started, the to instruction is output and the submaps are updated, and the sub-area $P_i$ is redistributed. If it does not conform to any of the situations in BS, it opens the high BL level map stage to start routing and outputs the tr instruction.

In some optional implementations, the $$BL_l^m$$

level map stage in step S103 specifically comprises:
In the $$BL_l^m$$

level map stage, the map level is improved step by step, and the map grid with the largest potential energy value is continued to be found in the high-level map. At the same time, its potential value J(tp) is calculated and the optimal tp point is selected. In the process of $USMV_i$ escaping local optimum, it still participates in BS determination in real time, and continues to evaluate the priority of independent coverage and collaborative partition.

In some optional implementations, the E stage of step S104 comprises:

Stage E is the end stage. According to $CS_{P_i} \in \{FN_i, UFN_i\}$, when the $USMV_i$ of all sub-area $P_i$ is transmitted back to $FN_i$, it is determined that the entire task area P coverage task is over. Through all the environmental information detected, the missing area is reviewed to generate coverage information.

The performance of the CCIBA* method of this disclosure in terms of path length, number of turns and coverage rate is compared with the traditional Boustrophedon algorithm and BA* algorithm in turn, and the number of turns is reduced by about 16.5% and 5.1% respectively; the number of units is decreased by 58.3% and 44.4% respectively; the coverage rate is increased by about 2.1% and 7.6% respectively. On the premise of ensuring complete coverage, the path length is not significantly increased compared with BA* algorithm, which is about 10.76% less than that of Boustrophedon algorithm which achieves complete coverage.

This disclosure also provides a computer-readable storage medium, such as flash memory, hard disk, multimedia card, card type memory (such as SD or DX memory), random access memory (RAM), static random access memory (SRAM), read-only memory (ROM), electrically erasable programmable read-only memory (EEPROM), programmable read-only memory (PROM), magnetic memory, disk, optical disk, server, app application mall, etc, a computer program is stored on it. When the program is executed by the processor, the coverage path planning method for multiple unmanned surface mapping vehicles in the implementation example is implemented.

It should be pointed out that according to the needs of implementation, each step/part described in this application can be divided into more steps/parts, and two or more steps/parts or partial operations of steps/parts can be combined into new steps/parts to achieve the purpose of this disclosure.

It is to be understood, however, that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A coverage path planning method for multiple unmanned surface mapping vehicless (USMVs) comprising:
(1) importing a static map in an initialization stage, initializing grid state according to the static map, creating submaps and an overall map synchronously, and conducting area division on the submaps and the overall map based on task performance; where, the static map is used to reflect the environmental information, the submaps represents area map formed after the gridded static map is divided into areas using Collaborative Coverage Improved Boustrophedon Algorithm* (CCIBA*) algorithm, and the overall map represents integration and iteration of the submaps;
(2) according to $USMV_i$ of each sub-area $P_i$ in the submaps

$$BL_i^i$$

and the overall map $$BL_l^m,$$

outputting its own position information ω and obstacle information η, transmitting to $$BL_l^i$$

and updating $$BL_l^m,$$

and then path planning is carried out to find a target point tp, wherein $USMV_i$ represents an ith USMV;
(3) when trapped in a local optimum, map level is updated layer by layer upward, and the target point tp is found in a corresponding level, and a behavior strategy (BS) determination is conducted, and sending tr instruction to the $USMV_i$ of the sub-area Pi, where, the BS determination represents the collaborative behavior strategy determination, tp represents grid index value of a next target point of USMV, and tr instruction indicates that the USMV is in a Travel state, which is the abnormal task status after the local optimum is reached, wherein a list of behavior strategies is defined as: $BS \in \{ex1, ex2, ex3, ex4\}$, ex1, ex2, ex3, ex4 correspond to four situations of area segmentation, backtracking transfer, area exchange, and joint recognition of obstacles in collaborative behavior strategies;

(4) if the target point has not yet been found in the highest map level, checking each $CS_{P_i} \in \{FN_i, UFN_i\}$, and the BS determination is over, where $CS_{P_i}$ represents the status of the regional depth sounding task in current sub-area where $USMV_i$ is located, $FN_i$ represents complete, and $UFN_i$ represents incomplete.

2. The coverage path planning method for multiple unmanned surface mapping vehicles according to claim 1, step S101 comprises:

at the beginning, each unmanned surface mapping vehicle is in a default starting position with a status of O; coordinate transformation grid index of the static map is established; grid status update is carried out in each submaps, and 0~L level assignment of all maps is updated in turn; the $USMV_i$ outputs the tn instruction; at the same time, the $USMV_i$ records and transmits its own position $\omega$ and obstacle information $\eta$, each $USMV_i$ starts to independently update its own grid status list GT_list and start collaborative coverage task, where tn means to guide the USMV in a normal state, so that it performs normal coverage tasks in the sub-area.

3. The coverage path planning method for multiple unmanned surface mapping vehicles according to claim 1, path planning gives priority to the BS determination, and outputting te or th status if any situation is met, and outputting $tp_m$ based on $$BL_I^m$$

planning when cross-area is involved; when it does not comply with any of the conditions of BS, a path planning will be performed independently and tn or tc status will be output, where $tp_m$ represents grid index value of location of next target point of the USMV in the overall map, tn means to guide the USMV to be in Normal status, tc means to guide the USMV to start depth sounding task, te indicates to guide the USMV to start switching areas and coordinate the coverage tasks between areas; th means to guide the USMV to continue to cover tasks in new areas.

4. The coverage path planning method for multiple unmanned surface mapping vehicles according to claim 1, conducting area division on the submaps and the overall map based on task performance, comprising:

(1) setting up multiple USMV sets, $U=\{USMV_i | 1 \le i \le I\}$, I represents the number of USMVs, and core goal of collaborative coverage is to enable i USMVs to fully traverse the entire task area P under premise of full efficiency;

(2) according to performance of the $USMV_i$ individual or ability to perform coverage tasks, the task performance index Hi (i=1, . . . , I) is proposed, which depends on sensor performance, task function, and energy consumption limit carried by the USMV, and $$\sum_{i=1}^{I} H_i = 1;$$

(3) an overall task area P is divided into I parts according to number of USMVs, where each part corresponds to area where the USMV is located, and each part is expressed by its percentage of area, where each part is expressed as $P_i$, i=1, . . . , $0<P_i<1$, and $$\sum_{i=1}^{I} P_i = 1;$$

(4) each grid $\alpha$ in the free space $P_F$ of the overall task area P is specified and scanned by at least one $USMV_i$:

$$Y(\alpha, i) = \begin{cases} 1, & BV_\alpha^i(t) \le 0 \\ 0, & else \end{cases}$$

$$\sum_{USMV_i \in U} Y(\alpha, i) \ge 1, \forall \alpha \in P_F$$

where, the free space is determined by $0<Pi<1$ and $$\sum_{i=1}^{I} P_i = 1,$$

and $Y(\alpha,i)$ represents the grid restriction, $$BV_\alpha^i(t)$$

represents the grid $\alpha$ assignment at time t in the BL-level map;

(5) for collaborative coverage of multiple unmanned surface mapping vehicles, the following factors are considered: overall coverage path, overall coverage time, single coverage performance, and overall coverage rate; firstly, $d_{cost}$ and $t_{cost}$ of an initial task area are estimated according to performance index $H_i$ of USMV where $d_{cost}$ represents coverage path, $t_{cost}$ represents coverage time, $d_{cost}$ is further modified according to distribution of obstacles, and $t_{cost}$ is adjusted considering the equipment carried by USMV, and redistributed sub-areas is finally output, where:

$$\min \varphi = k_1 \cdot \sum_{i=1}^{I} P_i(d_{cost}) + k_2 \cdot \max_i P_i(t_{cost})$$

$$S.T. \begin{cases} \sum_{i=1}^{I} P_i = 1 \\ k_1 + k_2 + 1 \\ \sum_{USMV_i \in U} Y(\alpha, i) \ge 1, \forall \alpha \in P_F \end{cases}$$

where $\varphi$ represents overall cost model of coverage of multiple unmanned surface mapping vehicles, $k_1$ represents cost coefficient of coverage path, $k_2$ represents the cost coefficient of coverage time, $P_i(d_{cost})$ represents estimated coverage path of $P_i$ region, $P_i(t_{cost})$ represents estimated coverage time of $P_i$ region.

5. The coverage path planning method for multiple unmanned surface mapping vehicles according to claim 1, wherein step (2) comprises:

in the $$BL_0^m$$

level map stage, potential energy priority is assigned to each submap row by row to ensure complete coverage path of $USMV_i$ in each submap;

if $BV_\omega > 0$ and $\{\omega^N, \omega^S\} \subset F^0$, it is consistent with the IBA* algorithm action of single USMV, and relative optimal path is selected; similarly, if one side of $\omega^N$ and $\omega^S$ is close to the obstacle, it is preferred to select this direction, and obstacle avoidance path of each interval $P_i$ is completed through this action, and ex4 process is started; $\omega$ represents number of grid sequences at the current position of USMV, and BV refers to assignment of number of grid sequences $\omega$ in BL highest-level map;

the detection field of USMV in grid map is recorded as $D^0(\omega)$, $\omega \in D^0(\omega)$, $D^0(\omega)$ contains all grid information that can be sensed by the current position of the USMV; for any grid $\alpha_0$ in $D^0(\omega)$, when the connection with $\omega$ does not pass through fz or obs state grid, and its potential energy value is positive, the set is defined as the priority field $F^0 \subseteq D^0(\mu)$, and the grids in the north and south directions in $D^0(\omega)$ are defined as $\omega^N$ and $\omega^S$;

if $BV_\omega > 0$, and only one side of $\omega^N$ and $\omega^S$ is ue status and the other side is forbidden area, then opening the tc instruction to guide the $USMV_i$ to start the depth sounding task, and updating $$BL_l^m$$

and $$BL_l^m$$

at the same time;

if $BV_\omega = 0$, $F^0 \neq \emptyset$, then $USMV_i$ begins to move to the next stage of traversal, taking $\alpha_0$ with the largest $BV_{\alpha_0}$ value in $F^0$ as the tp point, and $\alpha_0$ represents grid index;

when the above situations are inconsistent, it is determined that $USMV_i$ is in a locally optimal status at this time; before upgrading map level, BS determination is performed; when collaborative strategy is met, the preset action is started, the te instruction is output and the submaps are updated, and the sub-area $P_i$ is redistributed; when it does not conform to any of the situations in BS, it opens high BL level map stage to start routing and outputs the tr instruction.

6. The coverage path planning method for multiple unmanned surface mapping vehicles according to claim 5, wherein step (3) comprises:

in the $$BL_l^i$$

level map stage, the map level is improved step by step, and the map grid with the largest potential energy value is continued to be found in the high-level map; at the same time, the optimal tp point is selected; in the process of $USMV_i$ escaping local optimum, it still participates in BS determination in real time, and continues to evaluate the priority of independent coverage and collaborative partition.

7. The coverage path planning method for multiple unmanned surface mapping vehicles according to claim 6, wherein step (4) comprises:

according to $CS_{P_i} \in \{FN_i, UFN_i\}$, when the $USMV_i$ of all sub-area $P_i$ is transmitted back to $FN_i$, it is determined that the entire task area P coverage task is over; through all environmental information detected, missing area is reviewed to generate coverage information.

\* \* \* \* \*